(12) United States Patent
Yamada et al.

(10) Patent No.: US 11,022,673 B2
(45) Date of Patent: Jun. 1, 2021

(54) TERMINAL APPARATUS, LOCATION SERVER, LOCATION MEASUREMENT METHOD, AND PROGRAM

(71) Applicants: SHARP KABUSHIKI KAISHA, Sakai (JP); TOKYO INSTITUTE OF TECHNOLOGY, Tokyo (JP)

(72) Inventors: Ryota Yamada, Sakai (JP); Katsuya Kato, Sakai (JP); Yasuhiro Hamaguchi, Sakai (JP); Kazuhiko Fukawa, Yokohama (JP)

(73) Assignees: SHARP KABUSHIKI KAISHA, Sakai (JP); TOKYO INSTITUTE OF TECHNOLOGY, Tokyo (JP)

( * ) Notice: Subject to any disclaimer, the term of this patent is extended or adjusted under 35 U.S.C. 154(b) by 0 days.

(21) Appl. No.: 16/491,941

(22) PCT Filed: Mar. 7, 2018

(86) PCT No.: PCT/JP2018/008728
§ 371 (c)(1),
(2) Date: Sep. 6, 2019

(87) PCT Pub. No.: WO2018/164173
PCT Pub. Date: Sep. 13, 2018

(65) Prior Publication Data
US 2020/0072939 A1 Mar. 5, 2020

(30) Foreign Application Priority Data

Mar. 10, 2017 (JP) .............................. JP2017-046786

(51) Int. Cl.
*H04W 24/00* (2009.01)
*G01S 5/08* (2006.01)
*G01S 5/02* (2010.01)

(52) U.S. Cl.
CPC .............. *G01S 5/08* (2013.01); *G01S 5/0226* (2013.01)

(58) Field of Classification Search
None
See application file for complete search history.

(56) References Cited

U.S. PATENT DOCUMENTS

2003/0139188 A1* 7/2003 Chen ..................... G01S 5/0268
455/456.1
2009/0017837 A1 1/2009 Kim, II et al.
(Continued)

FOREIGN PATENT DOCUMENTS

JP 2007-537613 A 12/2007
JP 2008-157823 A 7/2008
(Continued)

OTHER PUBLICATIONS

3GPP, "3rd Generation Partnership Project; Technical Specification Group Radio Access Network; Evolved Universal Terrestrial Radio Access (E-UTRA); LTE Positioning Protocol (LPP) (Release 13)", TS 36.355 V13.3.0 (Dec. 2016), Dec. 30, 2016.
(Continued)

*Primary Examiner* — Jinsong Hu
*Assistant Examiner* — Alexander J Yi
(74) *Attorney, Agent, or Firm* — ScienBiziP, P.C.

(57) ABSTRACT

Provided is a terminal apparatus including: a receiver configured to detect a transmission direction of a signal used for communication with at least one base station apparatus; and a transmitter configured to transmit, to a location server, base station direction information for indicating the transmission direction detected.

6 Claims, 15 Drawing Sheets

(56) References Cited

U.S. PATENT DOCUMENTS

2012/0258729 A1* 10/2012 Siomina ................ G01S 5/0215
                                                       455/456.1
2015/0256970 A1*  9/2015 Arteaga ................ H04W 4/029
                                                       455/456.1
2017/0108579 A1*  4/2017 Irvine ........................ G01S 5/08

FOREIGN PATENT DOCUMENTS

JP          2009097985 A  *  5/2009
JP          2014-195159 A    10/2014

OTHER PUBLICATIONS

3GPP, "3rd Generation Partnership Project; Technical Specification Group Radio Access Network; Evolved Universal Terrestrial Radio Access (E-UTRA); LTE Positioning Protocol A (LPPa) (Release 13)", TS 36.455 V13.1.0 (Mar. 2016), Mar. 19, 2016.

* cited by examiner

TERMINAL APPARATUS, LOCATION SERVER, LOCATION MEASUREMENT METHOD, AND PROGRAM

TECHNICAL FIELD

The present invention relates to a terminal apparatus, a location server, a location measurement method, and a program.

This application claims priority based on JP 2017-046786 filed on Mar. 10, 2017, the contents of which are incorporated herein by reference.

BACKGROUND ART

In Long Terms Evolution (LTE) of $3^{rd}$ Generation Partnership Project (3GPP), a positioning protocol for measurement and management of a position of a terminal apparatus (LPP, LTE Positioning Protocol) is defined (refer to NPL 1, NPL 2). In this positioning protocol, a location server (E-SMLC/SLP, Enhanced Serving Mobile Location. Centre, Evolved Serving Mobile Centre, Secure User Plane Location (SUPL) Location Platform) calculates a position of a terminal apparatus, based on an arrival angle of a signal from the terminal apparatus (mobile station apparatus, UE, Use Equipment) acquired by a base station apparatus (eNB, eNodeB), information on a transmission time of a signal to and/or from the terminal apparatus, and the like.

CITATION LIST

Non Patent Literature

NPL 3GPP, "3rd Generation Partnership Project; Technical Specification Group Radio Access Network; Evolved Universal Terrestrial Radio Access (E-UTRA); LTE. Positioning Protocol (LPP) (Release 13)", TS 36.355 V13.3.0 (2016-12), 2016.12.30

NPL 2: 3GPP, "3rd Generation Partnership Project; Technical Specification Group Radio Access Network; Evolved Universal Terrestrial Radio Access (E-UTRA); LIE Positioning Protocol A (LPPa) (Release 13)", TS 36.455 V13.1.0 (2016-03), 2016.3.19

SUMMARY OF INVENTION

Technical Problem

However, in measuring a position of a terminal apparatus, based on an arrival angle of a signal from the terminal apparatus acquired by a base station apparatus, information on a transmission time of a signal to and/from the terminal apparatus, and the like, there is a problem that, measurement accuracy of a position may decrease in a case that these signals are transmitted by reflection waves rather than direct waves between the base station apparatus and the terminal apparatus.

One aspect of the present invention has been made in view of such circumstances, and provides a terminal apparatus, a location server, a position measurement method, and a program which can suppress decrease in measurement accuracy of a position in a case that a signal between a base station apparatus and the terminal apparatus is transmitted by a reflection wave.

Solution to Problem (1) An aspect of the present invention has been made to solve the above-described problem, and one aspect of the present invention is a terminal apparatus including: a receiver configured to detect a transmission direction of a signal used for communication with at least one base station apparatus; and a transmitter configured to transmit, to a location server for calculating a position of a terminal apparatus, base station direction information for indicating the transmission direction detected.

(2) Another aspect of the present invention is the above-described terminal apparatus, wherein the base station direction information indicates the transmission direction detected, based on any one of a transmission direction of a signal used for communication with one base station apparatus, a global coordinate system, and a local coordinate system.

(3) Another aspect of the present invention is the above-described terminal apparatus, wherein the base station direction information is based on an identical one direction with respect to transmission directions of signals used for communication with multiple base station apparatuses.

(4) Another aspect of the present invention is a location server including: an information acquisition unit configured to acquire terminal direction information for indicating a transmission direction of a signal, detected by each of multiple base station apparatuses, that is used for communication between each of the multiple base station apparatuses and a terminal apparatus, and base station direction information for indicating a transmission direction of a signal, detected by the terminal apparatus, that is used for communication between at least one of the multiple base station apparatuses and the terminal apparatus; and a position measurement unit configured to calculate a position of the terminal apparatus, based on the terminal direction information and the base station direction information.

(5) Another aspect of the present invention is the above-described location server, wherein the position measurement unit is configured to detect, based on the terminal direction information and the base station direction information, a base station apparatus, among the multiple base station apparatuses, of which a signal used for communication with the terminal apparatus, is a signal by reflection wave, and calculate the position of the terminal apparatus, by using a result of the detection and the terminal direction information or the base station direction information, (6) Another aspect of the present invention is the above-described location server, wherein the information acquisition unit is configured to acquire a transmission distance of the signal between the at least one base station apparatus of the multiple base station apparatuses and the terminal apparatus, and the position measurement unit is configured to use the transmission distance in calculating the position of the terminal apparatus.

(7) Another aspect of the present invention is a position measurement method including: a first process of detecting a transmission direction of a signal used for communication with at least one base station apparatus; and a second process of transmitting, to a location server for calculating a position of a terminal apparatus, base station direction information for indicating the transmission direction detected.

(8) Another aspect of the present invention is a position measurement method including: a first process of acquiring terminal direction information for indicating a transmission direction of a signal, detected by each of multiple base station apparatuses, that is used for communication between each of the multiple base station apparatuses and a terminal apparatus, and base station direction information for indicating a transmission direction of a signal, detected by the terminal apparatus, that is used for communication between at least one of the multiple base station apparatuses and the terminal apparatus: and a second process of calculating a position of the terminal apparatus, based on the terminal direction information and the base station direction information.

(9) Another aspect of the present invention is a program, for causing a computer to function as: a receiver configured to detect a transmission direction of a signal used for communication with at least one base station apparatus; and a transmitter configured to transmit, to a location server for calculating a position of a terminal apparatus, base station direction information for indicating the transmission direction detected.

(10).Another aspect of the present invention is a program for causing a computer to function as: an information acquisition unit configured to acquire terminal direction information for indicating a transmission direction of a signal, detected by each of multiple base station apparatuses, that is used for communication between each of the multiple base station apparatuses and a terminal apparatus, and base station direction information for indicating a transmission direction of a signal, detected by the terminal apparatus, that is used for communication between at least one of the multiple base station apparatuses and the terminal apparatus; and a position measurement unit, configured to calculate a position of the terminal apparatus, based on the terminal direction information and the base station direction information.

Advantageous Effects of Invention

According to one aspect of the present invention, it is possible to suppress a decrease in measurement accuracy of a position in a case that a signal between the base station apparatus and the terminal apparatus is transmitted by a reflection wave.

DESCRIPTION OF EMBODIMENTS

First Embodiment

Figure 1:
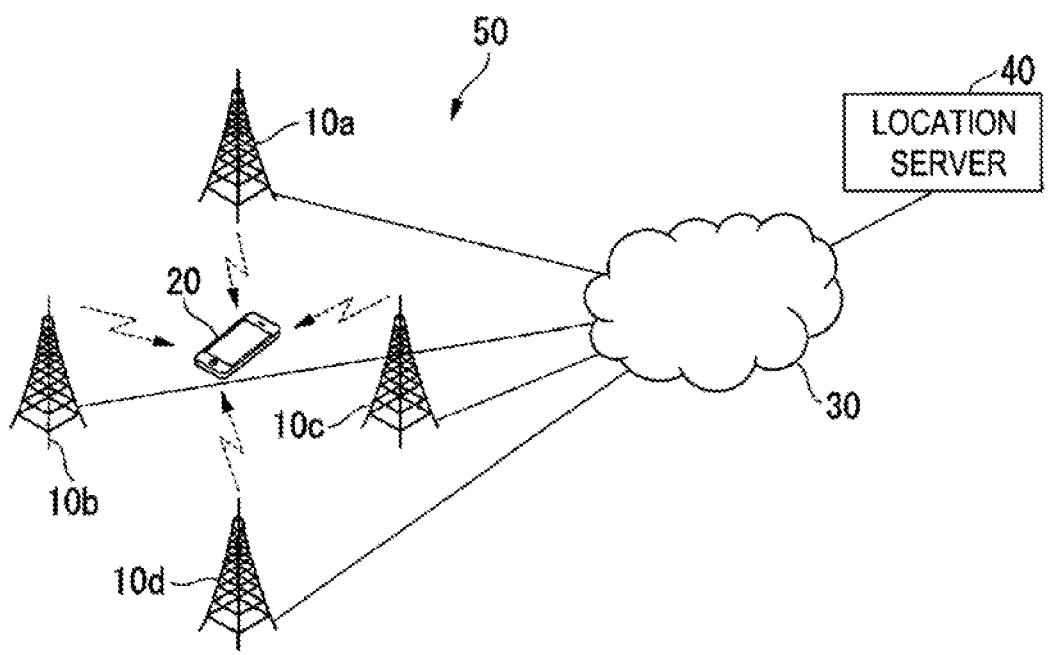
FIG. 1 is a schematic block diagram illustrating a configuration of a mobile communication system 50 according to a first embodiment of the present invention.

Hereinafter, a first embodiment of the present invention will be described with reference to the drawings. FIG. 1 is a schematic block diagram illustrating a configuration of a mobile communication system 50 according to the first embodiment of the present invention. The mobile communication system 50 includes base station apparatuses 10a, 10b, 10c and 10d, a terminal apparatus 20, a core network 30, and a location server 40. The base station apparatuses 10a, 10b, 10c and 10d perform communication with the terminal apparatus 20. The base station apparatuses 10a, 10b, 10c and 10d are connected to the location server 40 via the core network 30. The location server 40 calculates a two-dimensional or three-dimensional position (coordinate) of the terminal apparatus 20. As described below, the terminal apparatus 20 and the location server 40 communicate according to a positioning protocol (e.g., LPP), which is relayed by the base station apparatuses 10a, 10b, 10c and 10d and the core network 30. Furthermore, the location server 40 and the base station apparatuses 10a, 10b, 10c and 10d communicate in accordance with the positioning protocol A (e.g., LPPa), which is relayed by the core network 30.

Figure 2:
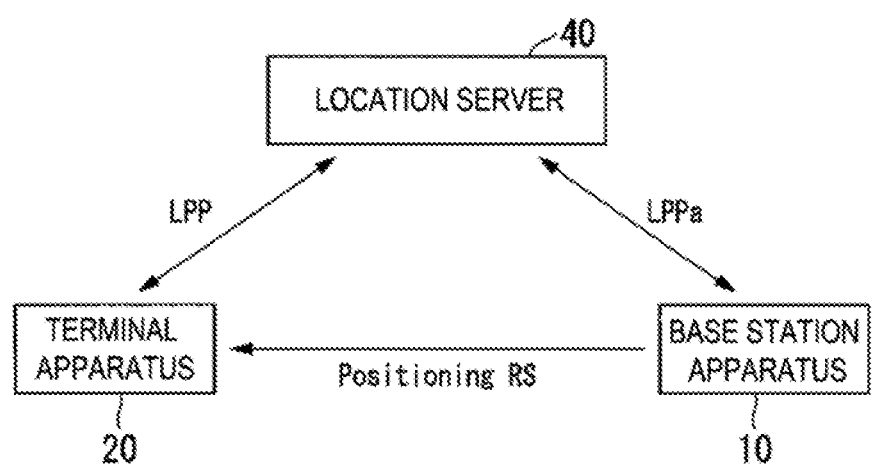
FIG. 2 is a schematic block diagram illustrating communication between apparatuses of the mobile communication system 50 according to the present embodiment.

FIG. 2 is a schematic block diagram illustrating communication between apparatuses of the mobile communication system 50 according to the present embodiment. In FIG. 1, the mobile communication system 50 includes four base station apparatuses 10a, 10b, 10c. 10d, but the base station apparatus 10 in FIG. 2 is representative of the four base station apparatuses 10a, 10b, 10c. 10d. As illustrated in. FIG. 2, the base station apparatus 10 transmits a downlink signal for position estimation such as a positioning reference signal (Positioning RS, PRS). For example, the terminal apparatus 20 detects (estimates) measurement information (observation information) relating to position estimation such as an arrival angle and a propagation delay time (propagation distance, transmission distance) by using the positioning reference signal. Note that the terminal apparatus 20 can detect (estimate) multiple types of measurement information from the positioning reference signal, such as the arrival angle and the propagation delay time. The terminal apparatus 20 may estimate the arrival angle by using a certain downlink signal, and estimate the propagation delay time by using another downlink signal. The terminal apparatus 20 performs communication with the location server 40 in accordance with the positioning protocol (LPP). The terminal apparatus 20 transmits (reports) information indicating the detected arrival angle (arrival direction) (base station direction information) and/or the propagation delay time (propagation distance, transmission distance), and the like, as Location Information, to the location server 40 in communication in accordance with the positioning protocol, Note that the terminal apparatus 20 transmits the location information to the location server 40 in a case that the location information is requested from the location server 40. For example, the terminal apparatus 20 is required to report the base station direction information or the propagation delay time, or the base station direction information and the propagation delay time as location information. The location server 40 can transmit assist data for location information measurement to the terminal apparatus 20. For example, the assist data includes configuration information for the base station apparatus (cell). The configuration information for the base station apparatus (cell) includes part or all of physical cell ID, carrier frequency, number of antenna ports, and PRS information. The PRS information indicates a bandwidth or subframe at which PRS is transmitted, and a resource element on which the PRS is allocated. The resource element is defined by one subcarrier and one Orthogonal Frequency Division Multiplexing (OFDM) symbol. In a case that the reference base station apparatus (reference cell) is present, the configuration information for the base station apparatus (cell) includes configuration information for the reference base station apparatus (reference cell) and configuration information for a neighboring base station apparatus (neighboring cell). Each of the configuration information of the reference base station apparatus (reference cell) and the configuration information of the neighboring base station apparatus (neighboring cell) include some or all of physical cell ID, carrier frequency, number of antenna ports, and PRS information.

The location information is information for two-dimensional or three-dimensional position estimation, and the terminal apparatus 20 determines the corresponding location information, based on the indication from the location server 40. In a case that three-dimensional location information is requested, the terminal apparatus 20 can transmit two-dimensional location information and height information (sea level, altitude, and the like) determined from an air pressure sensor and the like, as three-dimensional location information to the location server 40.

The base station apparatus 10 detects (estimates) an arrival angle (arrival direction) of a signal (e.g., Sounding RS (SRS), Demodulation RS (DMRS)) from the, terminal apparatus 20. The base station apparatus 10 performs communication with the location server 40 in accordance with the positioning protocol A (LPPa). The base station apparatus 10 transmits information indicating the detected arrival angle (terminal direction information) to the location server 40 in communication in accordance with the positioning protocol A. The location server 40 acquires the base station direction information from the terminal apparatus 20 in communication in accordance with the positioning protocol, and acquires the terminal direction information from the base station apparatus 10 in communication, in accordance with the positioning protocol A. The location server 40 determines whether or not the positioning reference signal received by the terminal apparatus 20 is transmitted by a reflection wave (reflection path) from the base station apparatus 10, based on the acquired base station direction information and the terminal direction information. In a case that the positioning reference signal is transmitted by a reflection wave, the location server 40 measures the position of the terminal apparatus 20, by using terminal direction information excluding the terminal direction information acquired from the base station apparatus 10 of the transmission source of the positioning reference signal.

Figure 3:
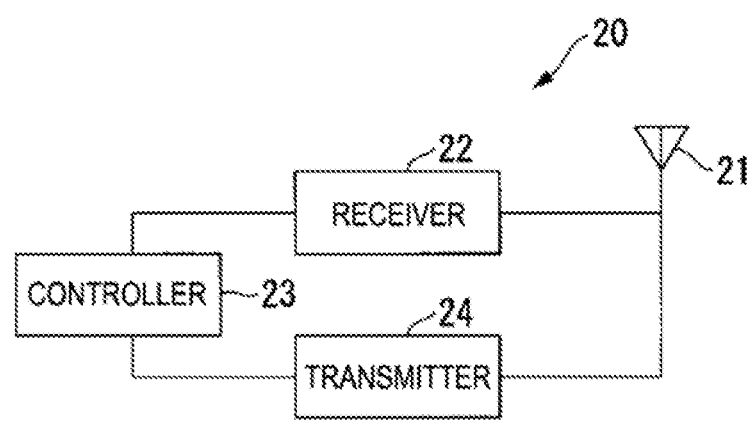
FIG. 3 is a schematic block diagram illustrating a configuration of a terminal apparatus 20 according to the present embodiment.

FIG. 3 is a schematic block diagram illustrating a configuration of the terminal apparatus 20 according to the present embodiment. The terminal apparatus 20 includes an array antenna 21, a receiver 22, a controller 23, and a transmitter 24. The array antenna 21 is an array antenna in which multiple antenna elements are arrayed in a two-dimensional plane.

The receiver 22 receives signals from the base station apparatus 10 by using the array antenna 21 and decodes the signals to generate received data. The receiver 22 detects the arrival angle of the positioning reference signal from the base station apparatus 10 by using the array antenna 21.

The controller 23 controls the entire terminal apparatus 20. For example, the controller 23 generates transmission data, based on the received data acquired from the receiver 22, input to the terminal apparatus 20 by the user, performance of an application, and the like, and inputs the generated data to the transmitter 24. The controller 23 according to the present embodiment inputs, to the transmitter 24, base station direction information indicating an arrival angle of the positioning reference signal from at least one base station apparatus 10, which is the arrival angle detected by, the receiver 22, as transmission data directed to the location server 40 in accordance with the positioning protocol. The transmitter 24 encodes and modulates the input transmission data to generate a transmit signal. The transmitter 24 transmits the generated transmit signal to the base station apparatus 10 via the array antenna 21.

Figure 4:
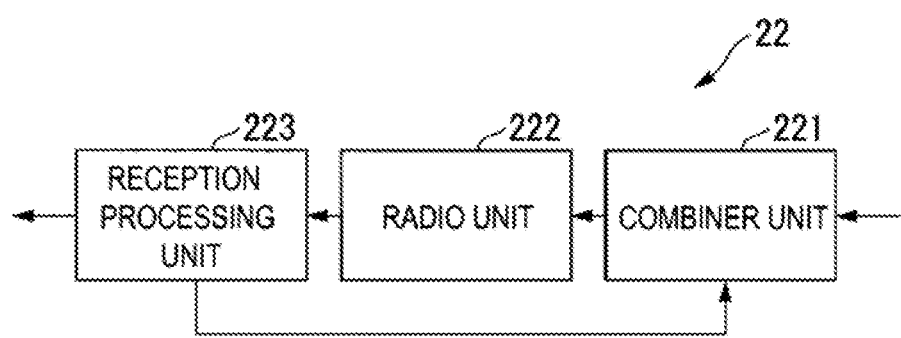
FIG. 4 is a schematic block diagram illustrating a configuration of a receiver 22 according to the present embodiment.

FIG. 4 is a schematic block diagram illustrating a configuration of the receiver 22 according to the present embodiment. The receiver 22 includes a combiner unit 221, a radio unit 222, and a reception processing unit 223. The combiner unit 221 extracts a signal of a particular arrival angle by providing a phase rotation to signals received by the antenna elements of the array antenna 21 and then synthesizing the signals. The radio unit 222 converts the signal extracted by the combiner unit 221 by down-conversion and analog-to-digital conversion to generate a digital baseband signal. The reception processing unit 223 decodes the digital baseband signal to generate received data. The reception processing unit 223 detects (estimates) an arrival angle of the positioning reference signal from each base station apparatus 10, by changing the arrival angle of the signal extracted by the combiner unit 221, and determining which positioning reference signal of any base station apparatus 10 is included in the digital baseband signal at which arrival angle.

Figure 5:
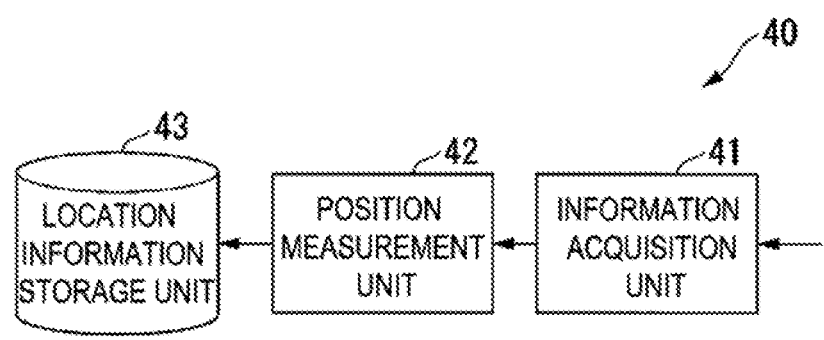
FIG. 5 is a schematic block diagram illustrating a configuration of a location server 40 according to the present embodiment.

FIG. 5 is a schematic block diagram illustrating a configuration of the location server 40 according to the present embodiment. The location server 40 includes an information acquisition unit 41, a position measurement unit 42, and a location information storage unit 43. The information acquisition unit 41 communicates with the terminal apparatus 20 in accordance with the positioning protocol, and acquires base station direction information indicating an arrival angle of the positioning reference signal from at least one base station apparatus 10. The information acquisition unit 41 communicates with each base station apparatus 10 in accordance with the positioning protocol A to acquire terminal direction information.

The position measurement unit 42 determines, based on the base station direction information and the terminal direction information acquired by the information acquisition unit 41, the base station apparatus(es), of which the received positioning reference signal is transmitted by a reflection wave, among the base station apparatuses 10. The position measurement unit 42 measures the position of the terminal apparatus 20, by using the terminal direction information detected by the base station apparatuses 10 excluding base station apparatus(es) 10 in which the positioning reference signal is determined to be transmitted by a reflection wave. A known method such as a triangulation method or a least square method, can be used for measuring the position. The position measurement unit 42 stores location information indicating the measured position in the location information storage unit 43.

The base station direction information will be described in detail below. The base station direction information transmitted by the terminal apparatus 20 to the location server 40 may be based on any of A) a global coordinate system, B) a local coordinate system, and C) an arrival direction of a signal used for communication with one base station apparatus 10 (reference base station apparatus). Hereinafter, base station direction information for A) is referred to as base station direction information based on a global coordinate system, base station direction information for B) is referred to as base station direction information based on a local coordinate system, and base station direction information for C) is referred to as base station direction information based on the reference base station.

Figure 6:
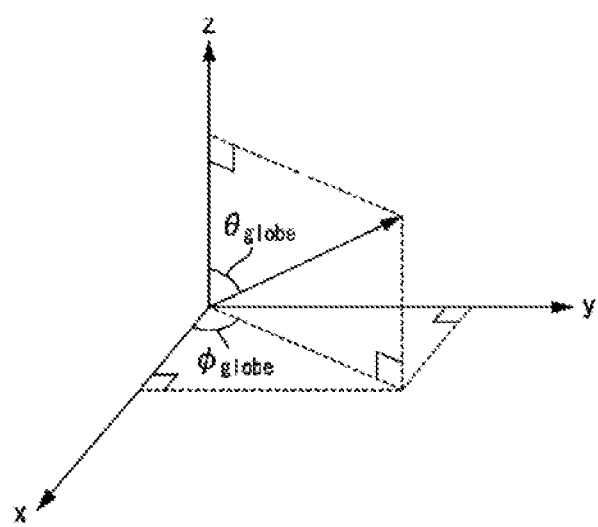
FIG. 6 is a diagram illustrating base station direction information based on a global coordinate system according to the present embodiment.

FIG. 6 is a diagram illustration the base station direction information based on the global coordinate system according to the present embodiment. The base station direction information based on a global coordinate system includes, for example, information indicating the azimuth angle $\phi_{globe}$ (horizontal direction) and information indicating the zenith angle $\theta_{globe}$ (vertical direction), based on the global coordinates where the zenith direction is a z-axis direction and the magnetic north direction is a y-axis direction. For example, the terminal apparatus 20 includes a gravity (acceleration) sensor and a geomagnetic sensor, with the direction opposite to the gravity direction detected by the gravity (acceleration) sensor being the z-axis direction, and the magnetic north direction detected by the geomagnetic sensor being the y-axis direction. At this time, since a direction vector (x y z) is represented by Equation (1), the base station direction information based on the global coordinate system may include information indicating these x, y, and z.

Equation 1

$$\begin{pmatrix} x \\ y \\ z \end{pmatrix} = \begin{pmatrix} \sin\theta_{globe}\cos\phi_{globe} \\ \sin\theta_{globe}\sin\phi_{globe} \\ \cos\theta_{globe} \end{pmatrix} \quad (1)$$

Figure 7:
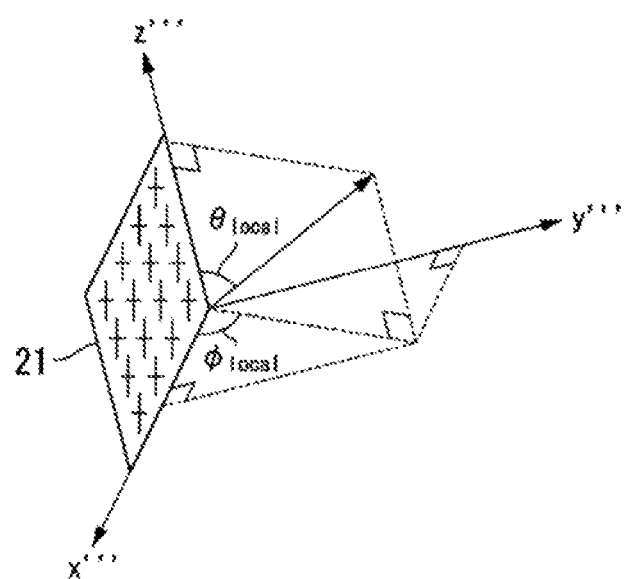
FIG. 7 is a diagram illustrating the base station direction information based on a local coordinate system according to the present embodiment.

FIG. 7 is a diagram illustrating the base station direction information based on the local coordinate system according to the present embodiment. The base station direction information based on the local coordinate system includes, for example, information indicating the horizontal direction and information indicating the vertical direction $\theta_{local}$, based on local coordinates with the lateral (horizontal) direction of the array antenna 21 being a x''' axis direction, the longitudinal (vertical) direction being a z''' axis direction, and the direction perpendicular to a plane of the array antenna 21 being a y''' axis direction. At this time, since the direction vector (x''' y''' z''') is represented by Equation (2), the base station direction information based on the local coordinate system may include information indicating these x''', y''', z''', Equation 2

$$\begin{pmatrix} x''' \\ y''' \\ z''' \end{pmatrix} = \begin{pmatrix} \sin\theta_{local}\cos\phi_{local} \\ \sin\theta_{local}\sin\phi_{local} \\ \cos\theta_{local} \end{pmatrix} \quad (2)$$

Figure 8:
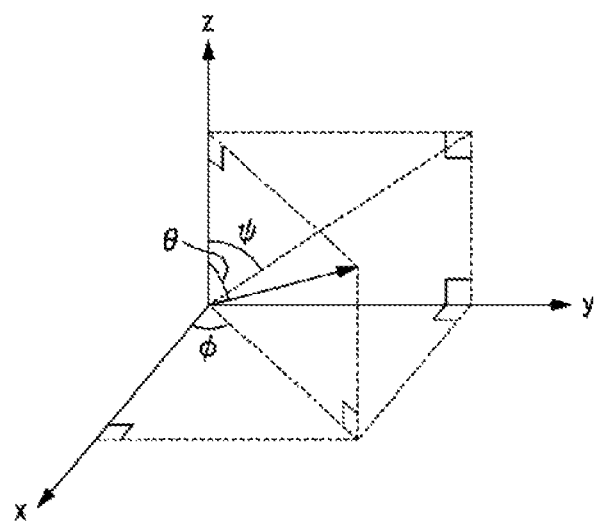
FIG. 8 is a diagram illustrating a relationship between an arrival angle detected using an array antenna 21 and a direction based on the local coordinate system according to the present embodiment.

FIG. 8 is a diagram illustrating a relationship between an arrival angle detected using the array antenna 21 and a direction based on the local coordinate system according to the present embodiment. In detecting the arrival angle by using the array antenna 21, the angle of the antenna elements in the array direction is detected. In FIG. 8, the antenna elements of the array antenna 21 are arrayed in the lateral direction and the longitudinal direction, with the lateral direction being the x-axis direction and the longitudinal direction being the z-axis direction. At this time, the lateral direction $\phi$ of the arrival angle detected using the array antenna 21 coincides with the horizontal direction $\phi_{local}$ of FIG. 7. However, the longitudinal direction $\psi$ of the arrival angle detected using the array antenna 21 is different from the vertical direction $\theta_{local}$ of FIG. 7, but can be converted by Equation (3).

Equation 3

$$\theta = \arctan\left(\frac{\tan\psi}{\sin\phi}\right) \quad (3)$$

The controller 23 of the terminal apparatus 20 uses Equation (3) to determine the horizontal direction, and the vertical direction $\theta_{local}$ from the lateral direction of the arrival angle and the longitudinal direction $\psi$ of the arrival angle detected using the array antenna 21, and uses information indicating these as the base station direction information. Note that the base station direction information based on the local coordinate system may include information indicating the lateral direction $\phi$ of the arrival angle and information indicating the longitudinal direction $\psi$ of the arrival angle. The base station direction information based on the local coordinate system may be information indicating a configuration for the terminal apparatus 20 for generating a beam in the lateral direction $\phi$ and the longitudinal direction $\psi$ (e.g. PMI; Precoding. Matrix Indicator, CRI; CSI-RS Resource Indicator, SRI; SRS Resource Indicator). Note that the CRI is information indicating one or more of multiple channel state information reference signal (CSI-RS) resources, and the SRI is information indicating one or more of multiple SRS resources. In a case that different beamforming (precoding) is applied to multiple CSI-RS resources or multiple SRS resources, the index of the resource indicates the arrival angle (arrival direction).

Figure 9:
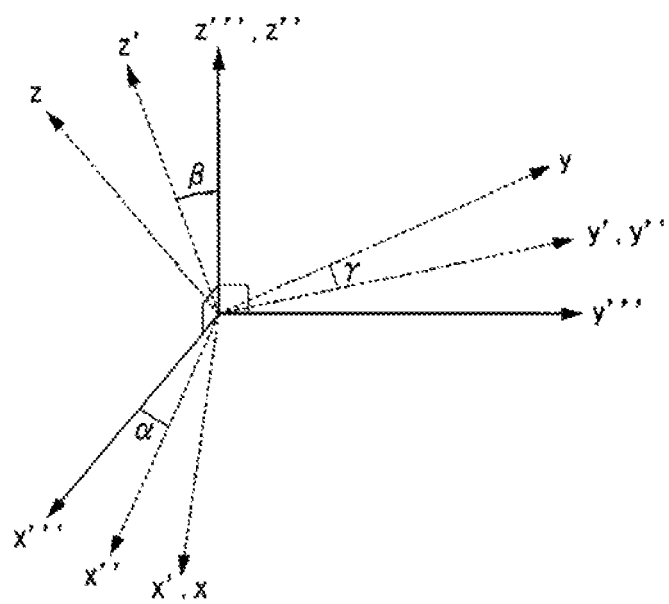
FIG. 9 is a diagram illustrating rotation by Euler angles.

Furthermore, in a case that the base station direction information is the base station direction information based on the local coordinate system, the base station direction information may include information (coordinate conversion information) indicating a relationship between the global coordinate system and the local coordinate system. The coordinate conversion information is, for example, information indicating a rotation for converting the local coordinate system to the global coordinate system. This rotation may be expressed by Euler angles (e.g., yaw angle α, roll angle β, pitch angle γ) or may be expressed by a quaternion. FIG. 9 is a diagram illustrating rotation by Euler angles. In FIG. 9, rotating the local coordinate system x''', y''', z''' by a about the z''' axis achieves the coordinate system x'', y'', z'' Next, rotating the coordinate system x'', y'', z'' by β around the y'' axis achieves the coordinate system x', y', and z', Next, rotating the coordinate system x', y', z' by γ about the x' axis achieves the global coordinate system x, y, z.

Rotation by quaternion is represented by Equation (4) using a rotation vector q. In Equation (4). v is a vector in the local coordinate system, and u is a vector in the global coordinate system. Furthermore, the rotation vector q is expressed by Equation (5) with the rotation axis n and the rotation amount ω.

Equation 4

$$u = qv\bar{q} \quad (4)$$

Equation 5

$$q = \cos\frac{\omega}{2} + n\sin\frac{\omega}{2} \text{ where,} \quad (5)$$
$$n = in_1 + jn_2 + kn_3$$
$$|n|^2 = 1$$
$$i^2 = -1, j^2 = -1, k^2 = -1, ijk = -1$$

Note that each terminal apparatus 20 determines the global coordinate system using a sensor, and thus in a case that the terminal apparatuses 20 use different sensors from each other, variations in the global coordinate system between the terminal apparatuses may be problematic. Moreover, the estimation in the global coordinate system may be difficult due to influences of surrounding buildings or the like. Thus, the base station direction information based on the global coordinate system and the coordinate conversion information may include information indicating the estimation performance of the global coordinate system, such as a variance value of errors of the global coordinate, reliability information, and the like.

Figure 10:
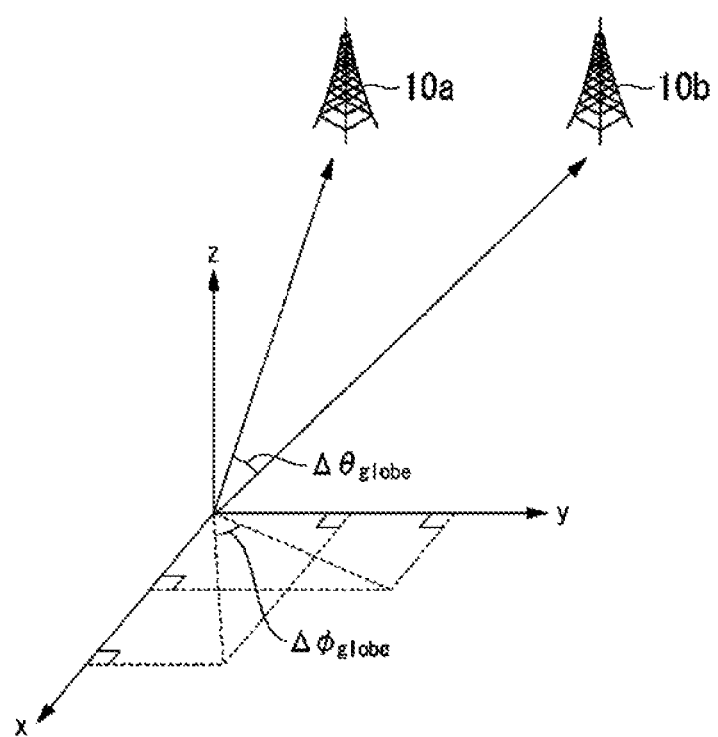
FIG. 10 is a diagram illustrating base station direction information by a reference base station according to the present embodiment.

FIG. 10 is a diagram illustrating base station direction information by a reference base station (reference cell) according to the present embodiment. In FIG. 10, the x-axis, y-axis, and z-axis are in the global coordinate system, a base station apparatus 10a is a reference base station, and a base station apparatus 10b is a neighboring base station (neighboring cell). At this time, the base station direction information of the base station apparatus 10b based on the reference base station includes information indicating a relative zenith angle $\Delta\theta_{globe}$ obtained by subtracting the zenith angle of the base station apparatus 10a from the zenith angle of the base station apparatus 10b, and information indicating a relative azimuth angle $\Delta\phi_{globe}$ obtained by subtracting the azimuth angle of the base station apparatus 10a from the azimuth angle of the base station apparatus 10b. The controller 23 of the terminal apparatus 20 may select the reference base station to include information indicating the reference base station in the base station direction information based on the reference base station.

Note that the x-axis, y-axis, and z-axis are assumed to be in the global coordinate system, but it is sufficient that at least one of the three axes corresponds to the global coordinate system.

In a case that the base station direction information based on the reference base station is used, the controller 2 of the terminal apparatus 20 may select the transmission source of the signal having the greatest receive power as the reference base station, since it is important that the positioning reference signal from the reference base station is transmitted by a direct wave (direct pass). Alternatively, any of the base station apparatuses 10a, 10b, 10c. 10d may select the base station apparatus 10, which has the greatest receive power of the signal from the terminal apparatus 20, as the reference base station, and notify the terminal apparatus 20 of the reference base station, The base station direction information based on the reference base station may be information indicating an angle formed by an arrival direction of a signal from the base station apparatus 10b and an arrival direction of a signal from the base station apparatus 10a. Note that in a case that the reference base station and the terminal apparatus 20 are transmitted by a direct wave, the terminal apparatus 20 may not report the base station direction information of the reference base station to the location server 40.

Figure 11:
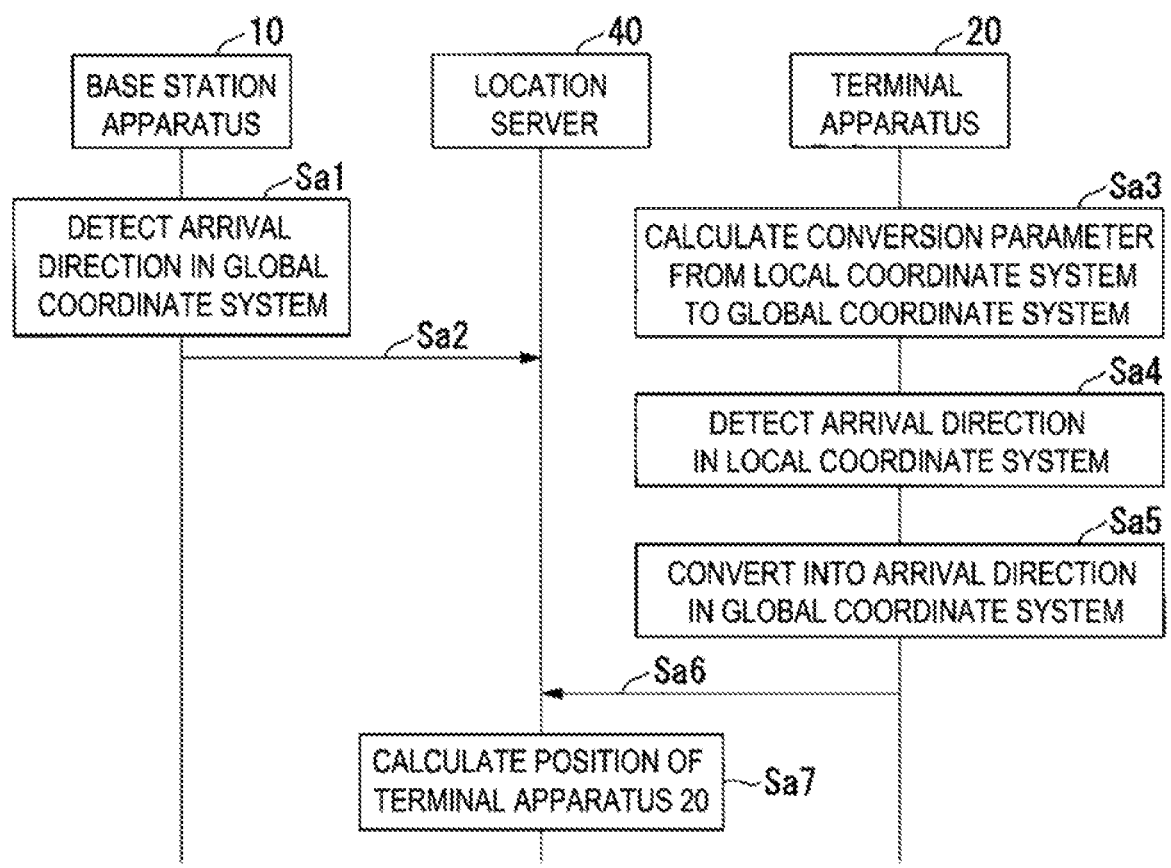
FIG. 11 is a sequence diagram illustrating an example of operation of the mobile communication system 50 according to the present embodiment.

FIG. 11 is a sequence diagram illustrating an example of operation of the mobile communication system 50 according to the present embodiment. The example operation illustrated in FIG. 11 is an example in which the terminal apparatus 20 transmits the base station direction information based on the global coordinate system to the location server 40. First, each of the base station apparatuses 10 detects an arrival direction of a signal from the terminal apparatus 20 in the global coordinate system (Sa1). Next, each of the base station apparatuses 10 transmits terminal direction information indicating the detected arrival direction to the location server 40 (Sa2).

In parallel with these sequences Sa1 and Sa2, the terminal apparatus 20 performs the following sequences Sa3 to Sa5. First, the controller 23 of the terminal apparatus 20 calculates the conversion parameter (coordinate conversion information) from the local coordinate system to the global coordinate system (Sa3). Next, the receiver 22 of the terminal apparatus 20 detects an arrival direction (an arrival angle) of the positioning reference signal of each of the base station apparatuses 10 (Sa4). The controller 23 of the terminal apparatus 20 converts the detected arrival direction into an arrival direction based on the global coordinate system to generate base station direction information (Sa5). The transmitter 24 transmits the base station direction information to the location server 40 (Sa6). The location server 40 calculates the position of the terminal apparatus 20, by using the terminal direction information acquired from each of the base station apparatuses 10 and the base station direction information related to each of the base station apparatuses 10 acquired from the terminal apparatus 20 (Sa7).

Note that in a case that the terminal apparatus 20 transmits the base station direction information based on the local coordinate system to the location server 40, the following two sequences Sa5' and Sa6' are included instead of the sequences Sa5 and Sa6 in FIG. 11. In the sequence Sa5', the transmitter 24 of the terminal apparatus 20 transmits, to the location server 40, base station direction information based on the local coordinate system and coordinate conversion information. In the sequence Sa6', the location server 40 converts the base station direction information based on the local coordinate system received from the terminal apparatus 20 to base station direction information based on the global coordinate system, by using the coordinate conversion information.

Figure 12:
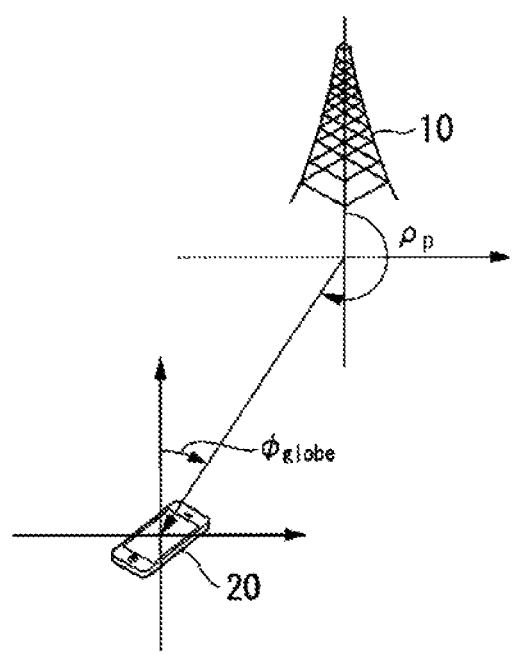
FIG. 12 is a diagram illustrating a method for determining, whether or not a signal is transmitted by a reflection wave according to the present embodiment.

FIG. 12 is a diagram illustrating a method for determining whether or not a signal is transmitted by a reflection wave according to the present embodiment. The method illustrated in FIG. 12 is an example of a case where the base station direction information based on the global coordinate system and the terminal direction information based on the global coordinate system are used. As illustrated in FIG. 12, in a case that the signal is transmitted by a direct wave, an absolute value of a difference between an azimuth angle $\phi_{globe}$ of base station direction information of any of the base station apparatuses 10 based on the global coordinate system and an azimuth angle $\rho_p$ of terminal direction information in the base station apparatus 10 based on the global coordinate system is $\pi$.

Therefore, the position measurement unit 42 of the location server 40 calculates the difference between an absolute value of a value obtained by subtracting $\rho_p$ from $\phi_{globe}$ and $\pi$, and determines that the signal is transmitted by a reflection wave in a case that an absolute value of the calculation result exceeds a prescribed threshold. Furthermore, since the same applies to the zenith angle $\theta_{globe}$ of base station direction information of any of the base station apparatuses 10 based on the global coordinate system and the zenith angle $\mu_p$ of terminal direction information in the base station apparatus 10 based on the global coordinate system, the position measurement unit 42 calculates a difference between an absolute value of a value obtained by subtracting $\mu_p$ from $\theta_{globe}$ and $\pi$, and determines that the signal is transmitted by a reflection wave in a case that an absolute value of the calculation result exceeds a prescribed threshold. In any of these two determinations, the position measurement unit 42 determines that the signal is transmitted by a direct wave in a case that the threshold is not exceeded. Note that the thresholds for these two determinations may not be the same.

Figure 13:
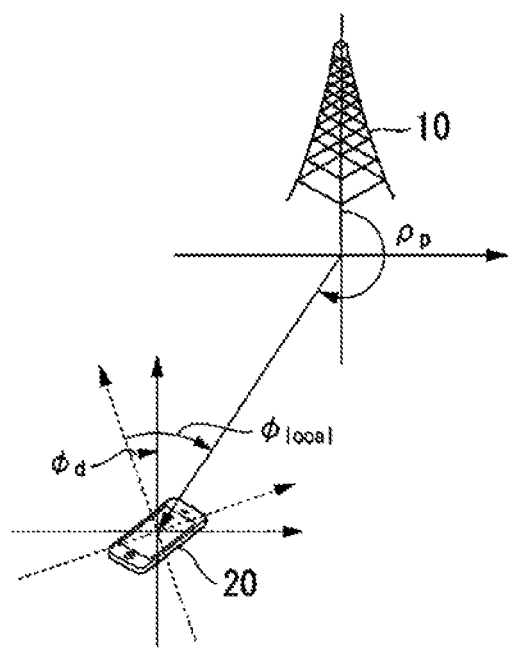
FIG. 13 is a diagram illustrating another method for determining whether or not a signal is transmitted by a reflection wave according to the present embodiment.

FIG. 13 is a diagram illustrating another method for determining whether or not a signal is transmitted by a reflection wave according to the present embodiment. The method illustrated in FIG. 13 is an example of a case where the base station direction information based on the local coordinate system and the terminal direction information based on the global coordinate system are used. As illustrated in FIG. 13, in a case that the signal is transmitted by a direct wave, an absolute value of a difference between a value obtained by subtracting $\phi_d$ from an azimuth angle $\phi_{local}$ of base station direction information of any of the base station apparatuses 10 based on the local coordinate system and an azimuth angle $\rho_p$ of terminal direction information in the base station apparatus 10 based on the global coordinate system is $\pi$. Here, $\phi_d$ is the angle of rotation about the z-axis for converting the local coordinate system to the global coordinate system.

The position measurement unit 42 calculates a difference between the absolute value of the difference between the value obtained by subtracting $\phi_d$ and $\phi_{local}$ and $\rho_p$, an $\pi$, and determines that the signal is transmitted by a reflection wave in a case that an absolute value of the calculation result exceeds a prescribed threshold value. A similar determination is made for the zenith angle. At this time, instead of $\phi_d$, an angle of rotation about an axis perpendicular to the zenith direction and perpendicular to the base station direction, for converting the local coordinate system to the global coordinate, system is used. In any of these two determinations, the position measurement unit 42 determines that the signal is transmitted by a direct wave in a case that the threshold is not exceeded. Note that the thresholds for these two determinations may not be the same.

Figure 14:
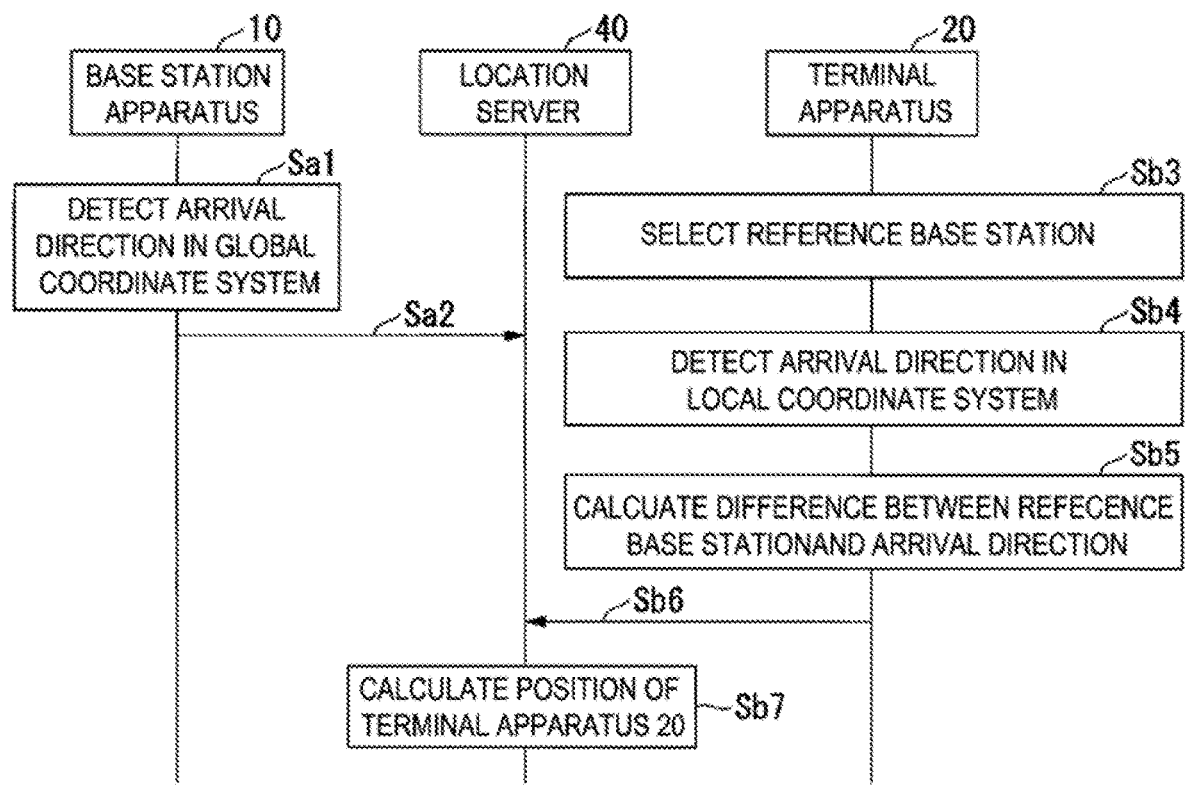
FIG. 14 is a sequence diagram illustrating another example of operation of the mobile communication system 50 according to the present embodiment.

FIG. 14 is a sequence diagram illustrating another example of operation of the mobile communication system 50 according to the present embodiment. The example operation illustrated in FIG. 14 is an example in which the terminal apparatus 20 transmits base station direction information based on a reference base station to the location server 40. In FIG. 14 as well as in FIG. 11, each base station apparatus 10 performs the sequences Sa1 and Sa2. In parallel with these sequences Sa1 and Sa2, the terminal apparatus 20 performs the following sequences Sb3 to Sb5.

First, the controller 23 of the terminal apparatus 20 selects the reference base station among the base station apparatuses 10 (Sb3). Next, the receiver 22 detects an arrival angle (arrival direction) of the positioning reference signal from each of the base station apparatuses 10 (Sb4). The controller 23 calculates a difference between each of the arrival directions among the base station apparatuses 10 other than the reference base station and the arrival direction of the reference base station (Sb5), and generates base station direction information indicating the calculated value. The transmitter 24 transmits the, base station direction information to the location server 40 (Sb6). The location server 40 calculates the position of the terminal apparatus 20, by using the terminal direction information acquired from each of the base station apparatuses 10 and the base station direction information for each of the base station apparatuses 10 excluding the reference base station acquired from the terminal apparatus 20 (Sb7).

Figure 15:
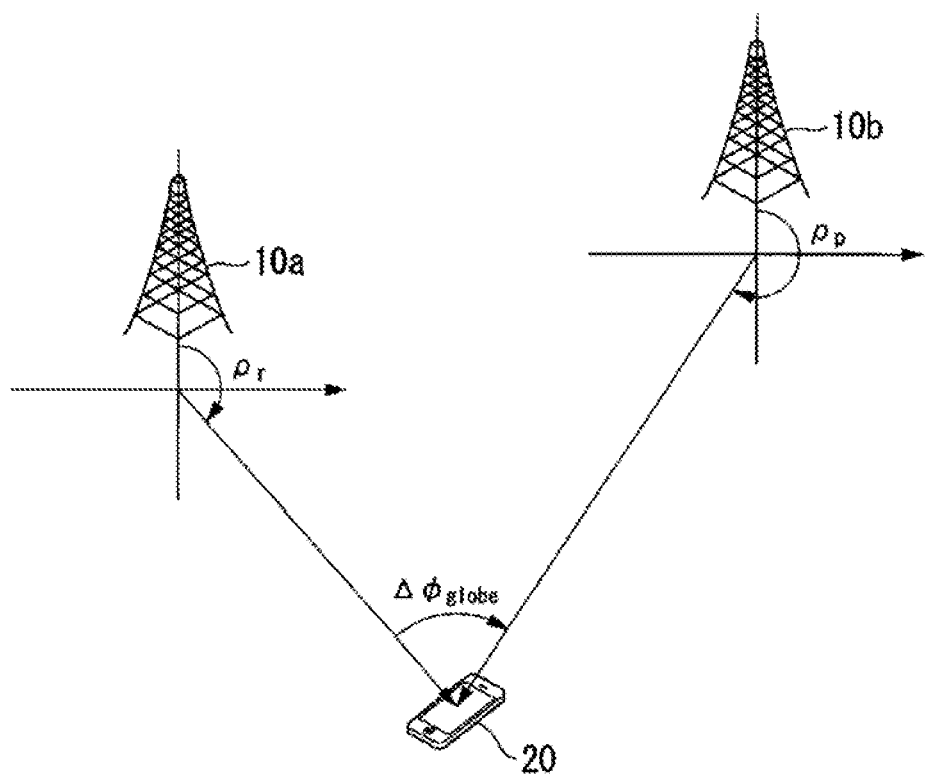
FIG. 15 is a diagram illustrating another method for determining whether or not a signal is transmitted by a reflection wave according to the present embodiment.

FIG. 15 is a diagram illustrating another method for determining whether or not a signal is transmitted by a reflection wave according to the present embodiment. The method illustrated in FIG. 15 is an example of a case where base station direction information $\Delta\phi_{globe}$ based on the reference base station and terminal direction information $\rho_r$ and $92_p$ based on the global coordinate system are used. Note that in FIG. 15, the base station apparatus 10a is the reference base station. Thus, the terminal direction information $p_r$ is terminal direction information based on the reference base station, and the base station direction information $\Delta\phi_{globe}$ is base station direction information of the base station apparatus 10b. The position measurement unit 42 of the location server 40 assumes a triangle having points, projected on a horizontal plane, of the base station apparatus 10a, the base station apparatus 10b, and the terminal apparatus 20, and determines that, in a case that a difference between the sum of the internal angles and $\pi$ exceeds a prescribed threshold, the positioning reference signal of the base station apparatus 10b is transmitted by a reflection wave. The position measurement unit 42 makes the similar determination on the zenith angle.

In any of these two determinations, the position measurement unit 42 determines that the signal is transmitted by a direct wave in a case that the threshold is not exceeded. Note that the thresholds for these two determinations may not be the same.

Note that the terminal apparatus 20 may use an arrival angle detected using a signal other than the positioning reference signal as the base station direction information. As the base station direction information, information indicating a transmission direction (direction of a transmission beam) of a transmit signal to the base station apparatus 10 may be used instead of an arrival angle. In other words, the base station direction information may be information indicating a transmission direction of a signal used for communication between the terminal apparatus 20 and the base station apparatus 10, and a transmission direction detected by the terminal apparatus 20.

The terminal direction information may be information indicating a transmission direction of a signal used for communication between the terminal apparatus 20 and the base station apparatus 10, and a transmission direction detected by the base station apparatus 10.

Instead of the terminal direction information, the position measurement unit 42 may acquire, from the base station apparatus 10 or the terminal apparatus 20, a distance between the base station apparatus 10 and the terminal apparatus 20, which is calculated based on a transmission time of a signal between the base station apparatus 10 and the terminal apparatus 20, and measure the position of the terminal apparatus 20.

In this manner, the position measurement unit 42 determines the base station apparatus in which the signal is transmitted by a reflection wave, by using base station direction information, and measures the position of the terminal apparatus 20, based on the determination result. As a result, a decrease in the measurement accuracy of the position can be suppressed in a case that a signal between any of the base station apparatuses 10 and the terminal apparatus 20 is transmitted by a reflection wave.

Second Embodiment

A second embodiment of the present invention will be described below. In the first embodiment, the location server 40 measures the position of the terminal apparatus 20 except for terminal direction information related to a signal transmitted by a reflection wave. In the second embodiment, the location server 40 estimates a reflected position of the signal, and measures the position of the terminal apparatus 20, by using the terminal direction information relating to the signal transmitted by a reflection wave.

In addition to the base station direction information and the terminal direction information, the information acquisition unit 41 according to the present embodiment also acquires transmission (propagation) distance information. The transmission distance information is information indicating a transmission (propagation) distance of a signal between each of the base station apparatuses 10 and the terminal apparatus 20. This transmission distance information is calculated based on round trip time of the signal between the apparatuses, by the base station apparatus 10 or the terminal apparatus 20.

Alternatively, the transmission distance between the base station apparatus 10 as reference (reference base station) and the terminal apparatus 20 is calculated based on the round trip time, and the transmission distance between each of other base station apparatuses 10 (neighboring base stations) and the terminal apparatus 20 is calculated based on a difference between the arrival time of the signal from the reference base station and the arrival time of the signal from the corresponding base station apparatuses 10.

The position measurement unit 42 according to the present embodiment first estimates a temporary position of the terminal apparatus 20 in the similar manner to the manner in the first embodiment. Next, the position measurement unit 42 again estimates the position of the terminal apparatus 20, by using the transmission distance information for the base station apparatus 10, in which it is determined that the signal is transmitted (once) by a reflection wave, and the estimated temporary position The position measurement unit 42 repeats, using the position of the terminal apparatus 20 estimated again as a temporary position, the estimation of the position of the terminal apparatus 20, by using the transmission distance information and the temporary position, until the predetermined end condition is satisfied, and makes the final estimated temporary position be the position of the terminal apparatus 20. The end condition is, for example, the number of repetitions.

The position measurement unit 42 estimates the position of the terminal apparatus 20 by using the distance information and the temporary position, for example, as follows. First, based on the terminal direction information, the position measurement unit 42 determines a reflection position in which the transmission distance to the temporary position on a straight line extended from the base station apparatus 10 is the distance indicated by the transmission distance information as the reflection position for the current calculation. The position measurement unit 42 again estimates the position of the terminal apparatus 20, by using the reflection position, base station direction information of the corresponding base station apparatus 10, and terminal direction information of each of the base station apparatuses 10 in which the signal is determined to be transmitted by a direct wave. Specifically, the position measurement unit 42 estimates the position of the terminal apparatus 20, with the opposite direction of the base station direction information of the corresponding base station apparatus 10 as the direction of the terminal apparatus 20, for the reflection position, and with the direction of the terminal direction information as the direction of the terminal apparatus 20, for each of the base station apparatuses 10 in which the signal is determined to be transmitted by a direct wave, by using a triangulation method or a least square method. Note that in a case that a reflection wave is used, the number of parameters to be estimated is increased compared to a case where a direct wave is used, so the reliability is reduced. Accordingly, the position measurement unit 42 may estimate a temporary position in consideration of the reliability depending on the direct wave and the reflection wave.

In this manner, the position measurement unit 42 according to the present embodiment determines the base station apparatus in which the signal is transmitted by a reflection wave, by using base station direction information, estimates the reflection position of the reflection wave, and measures the position of the terminal apparatus 20, based on the determination result. As a result, a decrease in the measurement accuracy of the position can be suppressed in a case that a signal between any of the base station apparatuses 10 and the terminal apparatus 20 is transmitted by a reflection wave.

The base station apparatus 10, the terminal apparatus 20, and the location server 40 in FIG. 2 may be realized by recording a program to realize functions (or some functions) of each of the base station apparatus 10, the terminal apparatus 20, and the location server 40 on a computer-readable recording medium and causing a computer system to read the program recorded on the recording medium for execution. The "computer system" here includes an OS and hardware components such as a peripheral device.

Furthermore, the "computer-readable recording medium" refers to a portable medium such as a flexible disk, a magneto-optical disk, a ROM, a CD-ROM, and the like, and a storage apparatus such as a hard disk built into the computer system. Moreover, the "computer-readable recording, medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Further, each functional block of the base station apparatus 10, the terminal apparatus 20, the location server 40 described above in FIG. 2 may be individually realized as chips, or may be partially or completely integrated into a chip. The circuit integration technique is not limited to LSI, and the integrated circuits for the functional blocks may be realized as dedicated circuits or a multi-purpose processor. It may be either hybrid or monolithic. Some functions may be realized as hardware and other may be realized as software.

Furthermore, in a case where with advances in semiconductor technology, a circuit integration technology with which an LSI is replaced and the like appears, it is also possible to use an integrated circuit based on the technology.

The embodiments of the present invention have been described in detail above referring to the drawings, but the specific configuration is not limited to the embodiments and includes, for example, an amendment to a design that falls within the scope that does not depart from the gist of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST

10, 10a, 10b, 10c, 10d Base station apparatus
20 Terminal apparatus
30 Core network
40 Location server
21 Array antenna
22 Receiver
23 Controller
24 Transmitter
41 Information acquisition unit
42 Position measurement unit
43 Location information storage unit
221 Combiner unit
222 Radio unit
223 Reception processing unit

The invention claimed is:

1. A communication apparatus configured to communicate with a location server apparatus,
the communication apparatus comprising:
reception circuitry configured to receive a reference signal for positioning and detect a first transmission direction of the reference signal; and
transmission circuitry configured to transmit, to the location server apparatus, transmission direction information indicating the first transmission direction based on one of a global coordinate system and a local coordinate system,
the global coordinate system and the local coordinate system being based on a three dimensional polar coordinates system, wherein: the transmission direction information indicates the first transmission direction by using an azimuth angle to an x axis and a zenith angle to a z axis, and the x axis is perpendicular to a y axis,
in a case that the transmission direction information indicates the first transmission direction based on the local coordinate system,
the transmission direction information includes coordinate transformation information indicating a relationship between the global coordinate system and the local coordinate system, and
the transmission circuitry transmits, to the location server apparatus, the transmission direction information including the coordinate transformation information, the coordinate transformation information being used by the location server for transforming the first transmission direction to a second transmission direction by performing three rotations by Euler angles,
the second transmission direction being based on the global coordinate system, and
the transmission direction information includes:
a first angle of counterclockwise rotation about the z axis;
a second angle of counterclockwise rotation about the y axis;
a third angle of counterclockwise rotation about the x axis; and
other information indicating an estimation performance of the global coordinate system that includes at least one of a variance value of errors of the global coordinate and reliability information.

2. The communication apparatus according to claim 1, wherein the coordinate transformation information includes a first parameter, a second parameter, and a third parameter, and the first rotation is performed around the z axis based on the first parameter, the second rotation is performed around the y axis based on the second parameter after the first rotation is performed, and the third rotation is performed around the x axis based on the third parameter after the second rotation is performed.

3. A method for a communication apparatus configured to communicate with a location server apparatus, the method comprising:
receiving a reference signal for positioning and detect a first transmission direction of the reference signal; and
transmitting, to the location server apparatus, transmission direction information indicating the first transmission direction based on one of a global coordinate system and a local coordinate system,
the global coordinate system and the local coordinate system being based on a three dimensional polar coordinates system,
wherein:
the transmission direction information indicates the first transmission direction by using an azimuth angle to an x axis and a zenith angle to a z axis, and the x axis is perpendicular to a y axis,
in a case that the transmission direction information indicates the first transmission direction based on the local coordinate system,
the transmission direction information includes coordinate transformation information indicating a relationship between the global coordinate system and the local coordinate system, and
the transmission direction information including the coordinate transformation information is transmitted to the location server apparatus, the coordinate transformation information being used by the location server for transforming the first transmission direction to a second transmission direction by performing three rotations by Euler angles, the second transmission direction being based on the global coordinate system, and the transmission direction information includes:

a first angle of counterclockwise rotation about the z axis;

a second angle of counterclockwise rotation about the y axis;

a third angle of counterclockwise rotation about the x axis; and other information indicating an estimation performance of the global coordinate system that includes at least one of a variance value of errors of the global coordinate and reliability information.

4. A location server apparatus configured to communicate with a communication apparatus, the location server apparatus comprising:

information acquisition circuitry configured to acquire, from the communication apparatus, transmission direction information indicating first transmission direction of a reference signal related to positioning based on one of a global coordinate system and a local coordinate system, the global coordinate system and the local coordinate system being based on a three dimensional polar coordinates system, wherein the transmission direction information indicates the first transmission direction by using an azimuth angle to an x axis and a zenith angle to a z axis, and the x axis is perpendicular to a y axis, in a case that the transmission direction information indicates the first transmission direction based on the local coordinate system, the transmission direction information includes coordinate transformation information indicating a relationship between the global coordinate system and the local coordinate system, and the information acquisition circuitry receives, from the communication apparatus, the coordinate transformation information included in the transmission direction information, and transforms the first transmission direction to a second transmission direction by using the coordinate transformation information and by performing three rotations by Euler angles, p1 the second transmission direction being based on the global coordinate system, and the transmission direction information includes:

a first angle of counterclockwise rotation about the z axis;

a second angle of counterclockwise rotation about the y axis;

a third angle of counterclockwise rotation about x-axis; and other information indicating an estimation performance of the global coordinate system that includes at least one of a variance value of errors of the global coordinate and reliability information.

5. The location server apparatus according to claim 4, wherein the coordinate transformation information includes a first parameter, a second parameter, and a third parameter, and the first rotation is performed around the z axis based on the first parameter, the second rotation is performed around the y axis based on the second parameter after the first rotation is performed, and the third rotation is performed around the x axis based on the third parameter after the second rotation is performed.

6. A method for a location server apparatus configured to communicate with a communication apparatus, the method comprising:

acquiring, from the communication apparatus, transmission direction information indicating first transmission direction of a reference signal related to positioning based on one of a global coordinate system and a local coordinate system, the global coordinate system and the local coordinate system being based on a three dimensional polar coordinates system, wherein the transmission direction information indicates the first transmission direction by using an azimuth angle to an x axis and a zenith angle to a z axis, and the x axis is perpendicular to a y axis, in a case that the transmission direction information indicates the first transmission direction based on the local coordinate system, the transmission direction information includes coordinate transformation information indicating a relationship between the global coordinate system and the local coordinate system, and the coordinate transformation information included in the transmission direction information is received from the communication apparatus, and the first transmission direction is transformed to a second transmission direction by using the coordinate transformation information and by performing three rotations by Euler angles, the second transmission direction being based on the global coordinate system, and the transmission direction information includes:

a first angle of counterclockwise rotation about the z axis;

a second angle of counterclockwise rotation about the y axis;

a third angle of counterclockwise rotation about x-axis; and other information indicating an estimation performance of the global coordinate system that includes at least one of a variance value of errors of the global coordinate and reliability information.

* * * * *